United States Patent
Pettersson

(10) Patent No.: US 11,861,961 B2
(45) Date of Patent: Jan. 2, 2024

(54) KEY MANAGEMENT SYSTEM

(71) Applicant: INSPECTREALESTATE.COM.AU PTY LTD, Indooroopilly (AU)

(72) Inventor: Dylan Pettersson, Indooroopilly (AU)

(73) Assignee: INSPECTREALESTATE.COM.AU PTY LTD, Indooroopilly (AU)

(*) Notice: Subject to any disclaimer, the term of this patent is extended or adjusted under 35 U.S.C. 154(b) by 346 days.

(21) Appl. No.: 17/268,520

(22) PCT Filed: May 17, 2019

(86) PCT No.: PCT/AU2019/050476
§ 371 (c)(1),
(2) Date: Feb. 15, 2021

(87) PCT Pub. No.: WO2020/037354
PCT Pub. Date: Feb. 27, 2020

(65) Prior Publication Data
US 2021/0241557 A1 Aug. 5, 2021

(30) Foreign Application Priority Data

Aug. 22, 2018 (AU) ................................ 2018903088

(51) Int. Cl.
*G07C 9/00* (2020.01)
*G06K 7/10* (2006.01)
(Continued)

(52) U.S. Cl.
CPC ..... *G07C 9/00896* (2013.01); *G06K 7/10297* (2013.01); *G06K 7/1413* (2013.01);
(Continued)

(58) Field of Classification Search
CPC ...... G07C 9/00896; G07C 2009/00936; G06K 7/10297; G06K 7/1413; G06K 7/1417;
(Continued)

(56) References Cited

U.S. PATENT DOCUMENTS

| 6,812,838 B1 * | 11/2004 | Maloney | A47G 29/10 340/568.1 |
| 7,336,174 B1 * | 2/2008 | Maloney | B25H 3/00 340/568.1 |

(Continued)

FOREIGN PATENT DOCUMENTS

| KR | 101260652 | * | 5/2013 | ............ G06K 19/10 |
| WO | 2014124529 A1 | | 8/2014 | |
| WO | WO2014124529 | * | 8/2014 | ............ G06Q 10/06 |

OTHER PUBLICATIONS

Key-Box, Key-Box 9500 SC Series (captured Aug. 13, 2018), https://www.keyboxsystems.com/product/key-box-9500-sc-series (Year: 2018).*

(Continued)

*Primary Examiner* — Jeff Zimmerman
*Assistant Examiner* — Mark C Clare
(74) *Attorney, Agent, or Firm* — Meunier Carlin & Curfman LLC

(57) ABSTRACT

An item management system and a key management system are provided. The key management system includes a plurality of keys, each key including an RFID tag in association therewith; a plurality of key storage positions, each for storing one or more of the plurality of keys; a visual indicator associated with each of the storage positions, the visual indicator configured to indicate a status of one or more of the key storage positions; at least one RFID reader configured to read the RFID tags of the plurality of keys; and at least one processor, coupled to the at least one RFID reader, the at least one processor configured to determine the presence of at least one of the plurality of keys in an associated storage position of the plurality of key storage positions.

12 Claims, 7 Drawing Sheets

(51) Int. Cl.
  *G06Q 10/02* (2012.01)
  *G06Q 10/087* (2023.01)
  *G06Q 30/0645* (2023.01)
  *G06Q 50/16* (2012.01)
  *G07C 9/20* (2020.01)
  *G07C 9/28* (2020.01)
  *G06K 7/14* (2006.01)

(52) U.S. Cl.
  CPC ........... *G06K 7/1417* (2013.01); *G06Q 10/02* (2013.01); *G06Q 10/087* (2013.01); *G06Q 30/0645* (2013.01); *G06Q 50/16* (2013.01); *G07C 9/215* (2020.01); *G07C 9/28* (2020.01); *G06K 2007/10504* (2013.01); *G07C 2009/00936* (2013.01)

(58) Field of Classification Search
  CPC ........... G06K 19/06028; G06K 19/067; G06K 2007/10504; G06K 19/048; G06Q 10/02; G06Q 10/087; G06Q 30/0645; G06Q 50/16; G06Q 50/163; G06Q 10/10; A47G 29/10
  USPC ............................................................ 705/5
  See application file for complete search history.

(56) References Cited

U.S. PATENT DOCUMENTS

| | | | | |
|---|---|---|---|---|
| 2006/0059964 A1* | 3/2006 | Bass | .................. | E05B 19/24 |
| | | | | 70/408 |
| 2007/0090921 A1* | 4/2007 | Fisher | .................. | G07C 9/00896 |
| | | | | 340/5.5 |
| 2007/0273534 A1* | 11/2007 | McGinn | .................. | E05B 63/0065 |
| | | | | 340/572.8 |
| 2009/0255304 A1* | 10/2009 | Kim | .................. | G07C 9/00896 |
| | | | | 70/460 |
| 2014/0236350 A1* | 8/2014 | Woodard | .................. | G06Q 10/06311 |
| | | | | 700/237 |
| 2019/0213366 A1* | 7/2019 | Gould | .................. | A47B 81/00 |

OTHER PUBLICATIONS

International Search Report and Written Opinion issued in PCT/AU2019/050476, dated Jun. 21, 2019, 10 pages.
Extended European Search Report issued in European Application No. 19852696.4 dated Mar. 28, 2022, 8 pages.

* cited by examiner

KEY MANAGEMENT SYSTEM

TECHNICAL FIELD

The present invention relates to management of items, such as keys. In particular, although not exclusively, the invention relates to the management of keys and other items in the real estate industry.

BACKGROUND ART

The management of keys in the real estate industry is a challenge. Typically, properties managers managing rental properties will manage a large number of properties, and as such have a large number of keys to manage. These keys need to be made readily accessible to property managers for inspections, to tradesmen and contractors for repairs, and to tenants.

Traditionally, property managers have used key cabinets, key numbers, and books or spreadsheets to manage their keys. In particular, when a key is borrowed, the details of the borrower are entered into the book or spreadsheet, and the key is taken.

A problem with such systems is that they are prone to error, and it is common for keys to go missing without any record in the book or spreadsheet. Furthermore, when a key is missing, this often goes unnoticed until the key is next required, which a) makes it almost impossible to relocate the key given that it may have gone missing a long time before being identified as missing, and b) requires the missing key to be rectified urgently.

Similar problems exist outside of the real estate industry. For example, cleaners and pool maintenance staff generally keep sets of keys for each of the properties in which they serve, which also are easily misplaced or go missing.

As such, there is clearly a need for an improved key management system.

It will be clearly understood that, if a prior art publication is referred to herein, this reference does not constitute an admission that the publication forms part of the common general knowledge in the art in Australia or in any other country.

SUMMARY OF INVENTION

The present invention is directed to item and key management systems, which may at least partially overcome at least one of the abovementioned disadvantages or provide the consumer with a useful or commercial choice.

With the foregoing in view, the present invention in one form, resides broadly in a key management system comprising:
- a plurality of keys, each key including an RFID tag in association therewith;
- at least one RFID reader configured to read the RFID tags of the plurality of keys; and
- at least one processor, coupled to the at least one RFID reader, the at least one processor configured to determine the presence of at least one of the plurality of keys according to data of the at least one reader.

Advantageously, the system enables more efficient and accurate management of the keys, which in turn reduces the number of missing keys.

Preferably, the system includes a plurality of key storage positions, each for storing one or more of the plurality of keys, wherein the at least one processor is configured to determine the presence of the one or more keys in the associated storage position.

Preferably, the at least one processor is further configured to determine the presence of a key in a storage position in which the key is not associated. An alert or notification may be issued based thereon, to enable the key to be repositioned correctly.

The key storage positions may be defined by retainers, such as hooks. The key storage positions may be provided in one or more key cabinets.

Preferably, the at least one processor is configured to provide a graphical user interface to a user, the graphical user interface including a key loan interface, which enables a key of the plurality of keys to be loaned to a user.

The key loan interface may include a property search tool, enabling the user to search for a key based upon property information.

The at least one processor may be configured to associate a loan period with the loan of the key by the user. The loan period may be defined at least in part using the key loan interface.

The key loan interface may further enable the user to book the key for a later time, thus defining a booked period. The key loan interface may then prevent the key from being loaned by another user during the booked period, or a period surrounding the booking period.

Preferably, the processor is configured to provide a graphical representation of the plurality of key storage positions, the graphical representation illustrating the presence of a key associated therewith in the key storage position. The graphical representation may be color coded to illustrate the presence or absence of a key in a key storage position.

Preferably, the RFID tag comprises an RFID key ring coupled to the key. Suitable, the RFID key ring is retained in the key storage position and thereby retains the key therein.

Preferably, the system includes a visual indicator associated with each of the storage positions. The visual indicator may indicate a status associated with one or more of the key storage positions, such as whether the key is correctly positioned or whether the key is overdue. The visual indicator may comprise an LED light.

The one or more processors is further configured to generate notifications based upon the status of one or more of the keys.

The notifications may include a notification to a borrower when a key is due or overdue. The notifications may include a notification to a property manager when a key is borrowed or returned.

Preferably, the system is configured to generate reports relating to a status of the keys. The report may include a missing key report, identifying each of the keys of the plurality of keys that is missing or overdue. This enables a user to promptly follow up missing keys, and thus have a greater likelihood of relocating same.

Preferably, the system is configured to generate a dashboard, providing an overview of the keys. The dashboard may indicate a number of keys that are available, and a number of keys that are not available.

The dashboard may indicate historical data relating to key returns, or overdue keys. The historical data may comprise trend data. This may be useful in identifying trends which may be utilised for efficiency, or to identify problems at an early stage (e.g. systematic overdue keys).

The system may further include a scanner, for scanning image data associated with a key. The key may be borrowed or returned, at least in part according to the scanned image data. The scanned image data may comprise a QR code or a barcode, for example.

At least one of the one or more processors may be remote to the RFID reader. The RFID reader may be coupled to the at least one processor by a wireless data interface.

In another form, the invention resides broadly in an item management system, for managing items, the item management system comprising:

a plurality of items, each item including an RFID tag in association therewith;

a plurality of item storage positions, each item storage position for storing one or more of the plurality of items;

at least one RFID reader configured to read the RFID tags of the plurality of items in the item storage positions; and at least one processor, coupled to the at least one RFID reader, the at least one processor configured to determine the presence of at least one of the plurality of items in an associated item storage position.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

Figure 1:
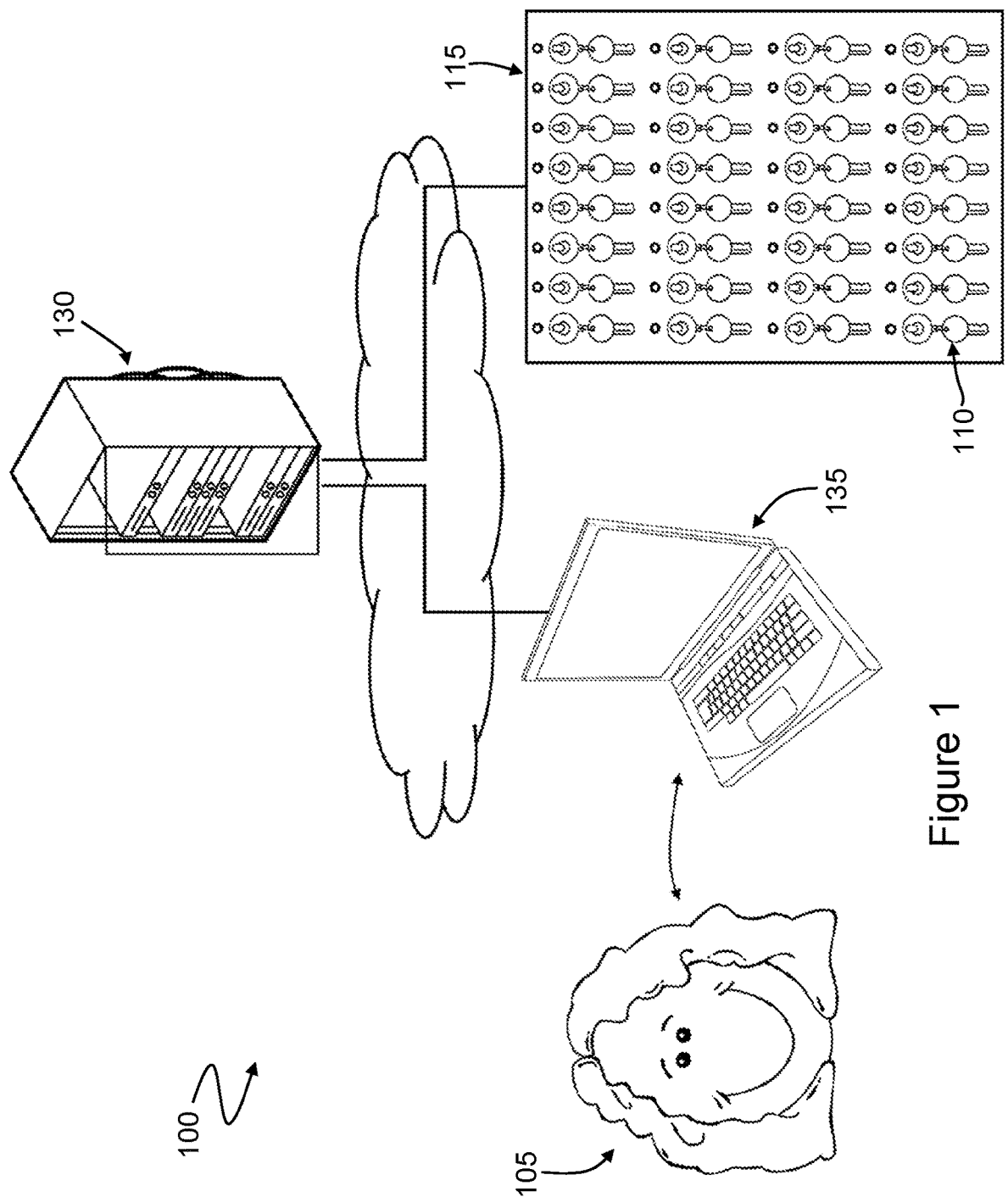
FIG. 1 illustrates a key management system, according to an embodiment of the present invention.

FIG. 1 illustrates a key management system 100, according to an embodiment of the present invention. The key management system 100 is particularly useful in property management, as it enables property managers 105 to quickly see what keys 110 are available and not, and of the keys 110 that are not available who has them and when they are due back.

Figure 2:
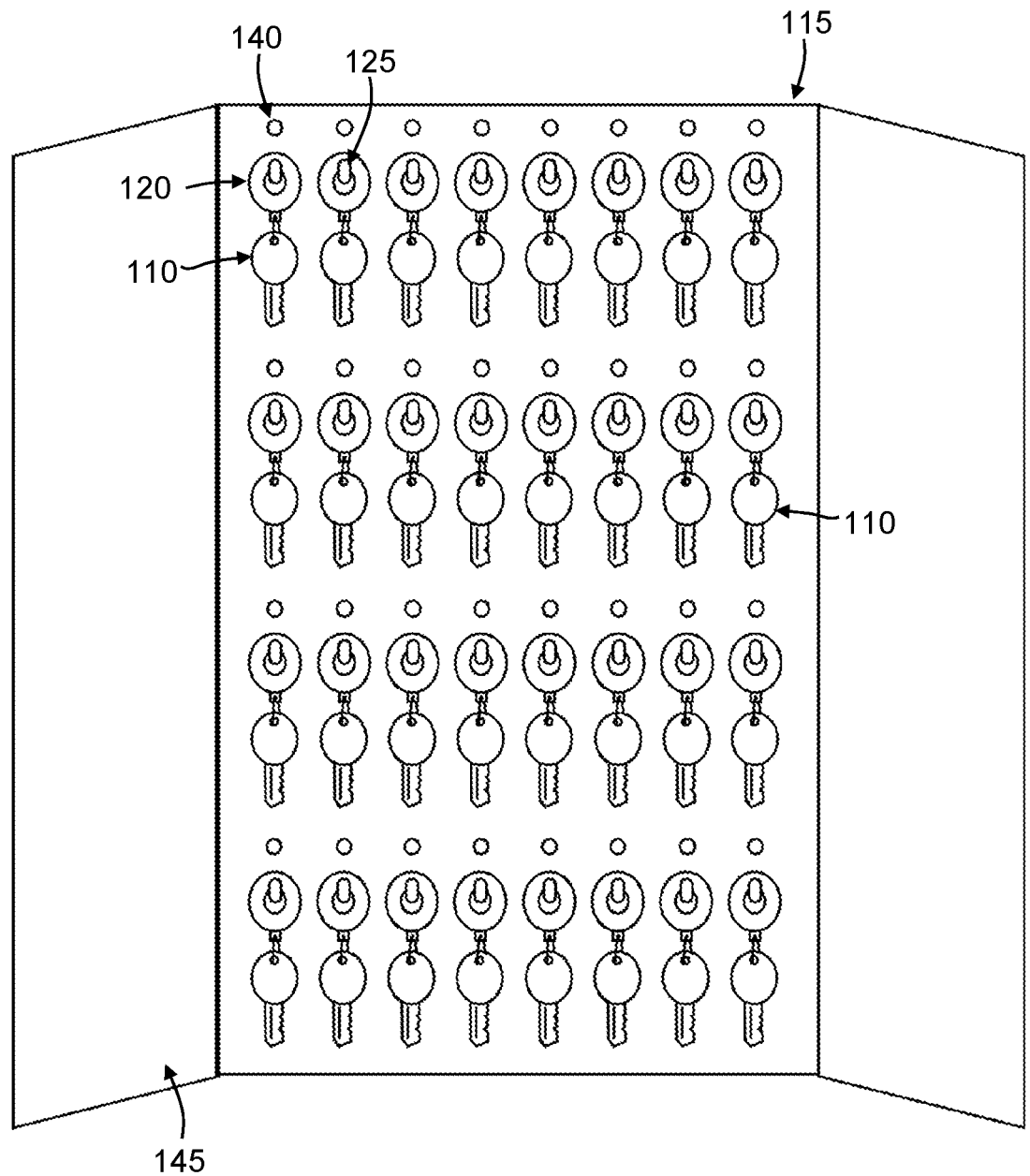
FIG. 2 illustrates an enlarged view of the key cabinet, according to an embodiment of the present invention.

The system 100 includes a key cabinet 115 which is configured to receive and store the keys 110, which provides automatic tracking of keys 110 into and out of the cabinet, and assists property managers 105 in identifying appropriate keys. FIG. 2 illustrates an enlarged view of the key cabinet 115, according to an embodiment of the present invention.

The keys 110 are each coupled to an RFID key chain 120, which includes data thereon in the form of a unique identifier. The cabinet 115 includes a plurality of predefined positions defined by hooks 125, which are configured to receive the RFID key ring 120 and thus the key 110 coupled thereto. The key ring 120 is annular in shape and configured to extend over the hook 125.

The cabinet 115 includes an RFID reader (not illustrated) associated with each of the predefined positions, the RFID reader configured to read data of an RFID key chain 120 in the respective position. The RFID reader may be configured to read data periodically or continuously, and as such, is able to determine whether a key 110 has been added or removed from the cabinet 115 by its ability to read the associated key chain 120 or not.

Data indicative of what keys 110 are present in the cabinet 115 is provided from the cabinet 115 to a remote server 130. To achieve this, and outlined in further detail below, the cabinet 115 includes a controller, coupled to the RFID reader, the controller comprising a wireless data interface which is coupled to the remote server 130 using the Internet.

The remote server 130 is configured to receive the data from the cabinet 115 and generates cabinet data therefrom, including a virtual cabinet representation indicating a status of each of the keys associated with a cabinet.

Either upon configuration of the system 100 or when a new key 110 is added, each key 110 is associated with the RFID key ring 120 on the server 130. This is generally achieved using a portal of the server 130, which the property manager 105 or an administrative staff member associated therewith logs onto using a computing device 135. A code or identifier of the RFID key ring 120 is then associated that with the particular property under management at the server 130.

A position in the cabinet 115 is then allocated to that RFID key ring 120 (and thus key 110), and the key is placed in the cabinet 115. The position in the cabinet 115 may be automatically defined, e.g. next available position, or entered manually, e.g. on a website accessed using the computing device 135.

The property manager 105 may log onto the server 130 as needed, using the computing device 135, or another device, to obtain a status of cabinet 115, such as what keys 110 are present, what a missing, what are overdue, etc.

Furthermore, the property manager 105 may search for a key 110 based upon property details or otherwise, and check out a key 110. When the key 110 is checked out, the details of the property manager 110, or the staff member that has checked out the key 110, are associated with the checking out of the key 110, as well as a term (loan period) in which the key 110 is checked out. The term may be automatically generated or manually entered.

Each position in the cabinet is associated with an indicator in the form of an LED light 140. When a key 110 is checked out on the server 130, the LED light 140 associated with the key 110 is updated to indicate same. As an illustrative example, the LED light 140 associated with the key 110 may illuminate blue when the key 110 is checked out (but still on the board) to make it easy for the property manager 105 to identify the correct key 110 to take (it should be the only blue light on the board).

The LED lights 140 illuminate in various colors to indicate a status of the associated key 110. As an illustrative example, the LED light 140 may shine green when a key 110 is correctly positioned in the cabinet 115 and not checked out, red when the associated key 110 is missing and not correctly checked out, flash purple when the key 110 has been checked out and is overdue, yellow when the RFID key ring 120 is being read, and strobing red when there is an error in reading the RFID key ring 120, or if the RFID ring 120 is not recognised or is invalid.

While the LED lights 140 are displayed adjacent to the hooks 125, in other embodiments the LED lights 140 may be incorporated into the hooks 125, or configured to illuminate the hooks 125.

When a key 110 is returned to the cabinet 115, the status of the LED lights 140 (which should turn green if the key 110 is correctly positioned) enables the property manager 105, or whomever is returning the key 110, to quickly confirm that the key 110 has been placed back in the correct position, and successfully registered into the system 100. This thus prevents keys 110 from being accidentally placed in the wrong position.

The returning of the key 110 is reported to the server 130, which is logged, and the status associated with the key 110 is then updated.

If a key is ultimately placed in the wrong position, and not repositioned, in addition to reporting this using the LED lights 140, this is also shown on the virtual cabinet when viewed from the server 130. As such, an administrator may log onto the server 130 to check a status of the keys and correct any incorrectly positioned keys immediately. Furthermore, notifications or alerts can be automatically sent to one or more administrators and/or to the property manager 105, to enable such issues to be rectified promptly, avoiding later issues or confusion.

The cabinet 115 includes a pair of doors 145 which can be closed and locked. This enables the keys 110 to be kept secure from theft. The lock may be configured to be activated based upon the checking in or out of the key. As outlined below, however, the system may be adapted to store keys in any suitable form, including outside of a cabinet.

Figure 3:
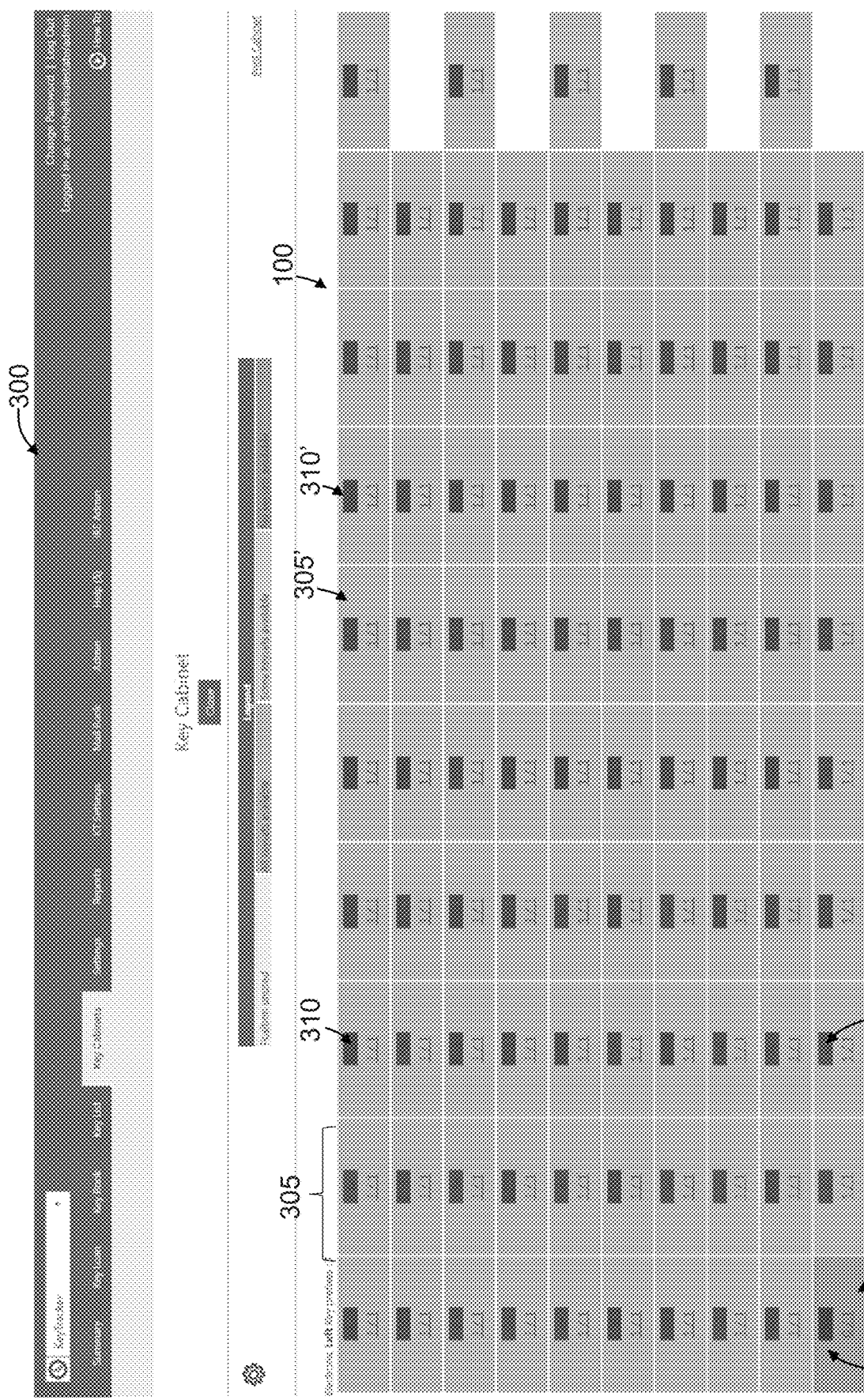
FIG. 3 illustrates a screenshot of a virtual cabinet screen of the system, according to an embodiment of the present invention.

FIG. 3 illustrates a screenshot 300 of a virtual cabinet screen of the system 100, according to an embodiment of the present invention. The virtual cabinet screen comprises a graphical representation of the cabinet 115, which is color coded according to a status of each associated key.

The cabinet screen includes a plurality of cells 305, each color coded according to an actual status of the cabinet 115, and a booking status identifier 310 within the cell 305, indicating a booking status associated with the key 110.

The cells 305 are generally colored light green, such as the cell 305' to indicate that all associated keys 110 are present, light yellow to indicate that some of the keys 110 are present, and pink, such as the cell 305", to indicate that none of the keys 110 are present.

The booking status identifier 310 that is within the cell 305 is colored bright green, such as the identifier 310', to indicate that all keys 110 are available to be booked, bright yellow to indicate that some keys 110 are available to be booked, and red, such as the identifier 310", to indicate that no keys are available to be booked. The booking status identifier is further colored purple, such as the identifier 310''', to indicate that the key 110 is checked out and overdue, and blue to indicate that the key has been checked out but not yet collected. Other colors may be used to indicate that a key is incorrectly positioned, missing without being checked out, or to indicate any other status associated with the key.

Finally, the cabinet screen includes a numerical key availability indicator, indicating numerically how many keys are available. This is particularly useful in case more than one set of keys is available for a property.

The cabinet screen is generally representative of the actual key cabinet 115, and thus enables the property manager to associate a location on the cabinet screen with a location on the actual cabinet 115. This is useful in case there is a problem with a particular key 110 or position, as the problem can be identified in the same place on the cabinet screen as it is in the actual cabinet.

The physical cabinet 115 (and the cabinet screen) generally do not include information about the property in which the key 110 is associated. This prevents persons from being able to rummage through the key cabinet 115 to identify a key for a particular property. Instead, each key ring 120 simply includes an identifier which is associated with the property at the server 130.

As such, the system 100 includes a key search screen, which is access controlled and logged, which enables the property manager 105, or authorised staff, to search for keys 110 based upon an address or key number.

Figure 4:
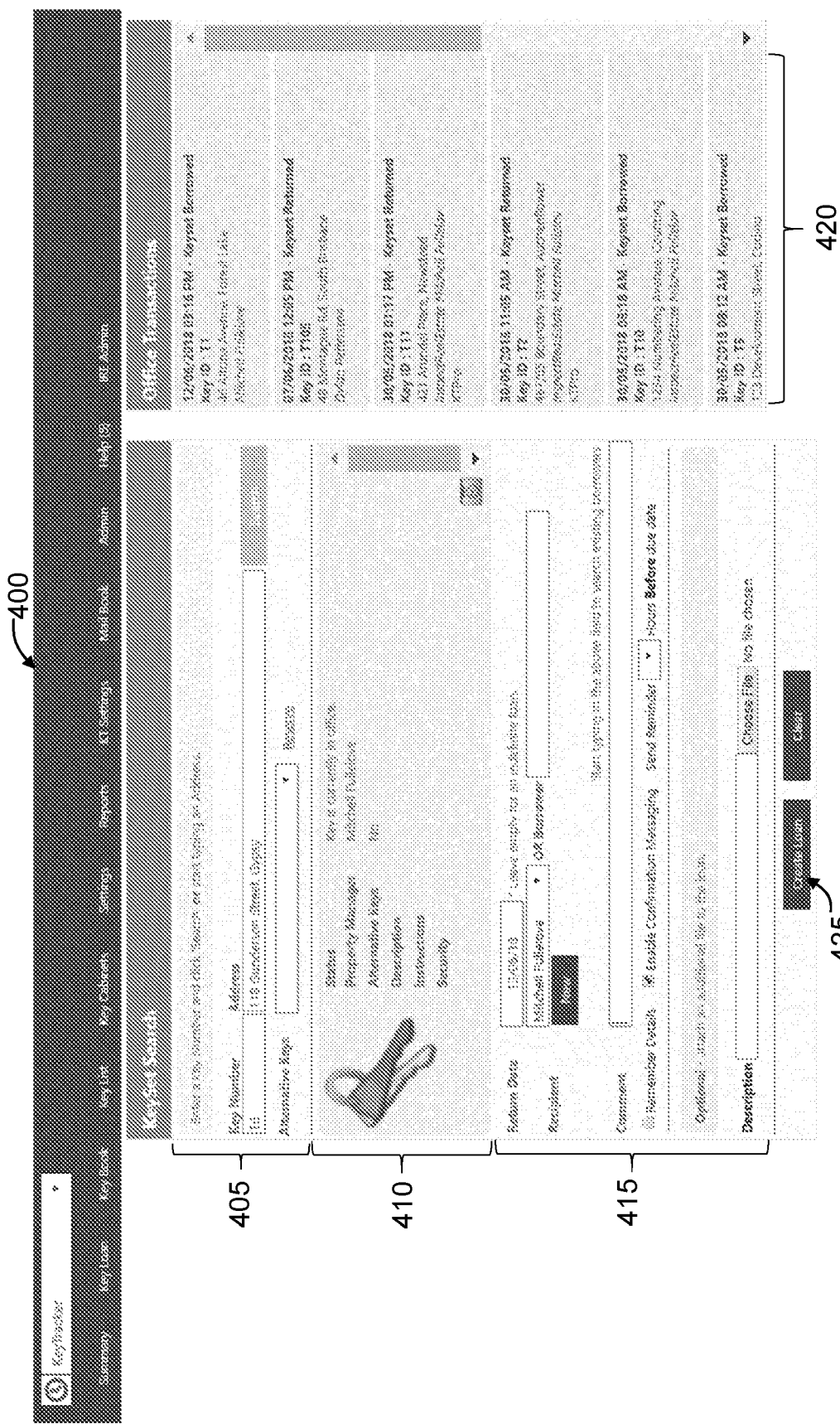
FIG. 4 illustrates a screenshot of a key search screen, according to an embodiment of the present invention.

FIG. 4 illustrates a screenshot 400 of a key search screen, according to an embodiment of the present invention. The key search screen enables the property manager 105 to search for keys 110 based upon details of the property or a key number.

The key search screen includes a search key component 405, which includes a key number field and an address field, to enable the property manager 105 to search based upon key number or address. The fields are text fields enabling the property manager 105 to enter full or partial details thereof.

Once details are entered, the details of the associated keys 110 are provided in a results component 410. The results component 410 includes a status of the key 110 (i.e. whether it is currently available), details of who the property manager 105 is, as well as specific instructions, security information or a textual description associated with the key 110. This enables the property manager 105 to verify that the correct key has been identified.

The property manager 105 is then able to enter booking details relating to the key 110 in a booking section 415, including a return date (essentially identifying a term associated with the loan), details of the recipient or borrower, and comments.

The booking section 415 includes reminder checkboxes and drop-down menus, which enable the user to enter details of when a reminder is to be sent (e.g. 24 hours before the return date). This is particularly useful in that such reminders may be assist in preventing keys from being overdue.

The key search screen further includes a transaction ledger component 420, illustrating recent transactions that have taken place, including keys being borrowed and keys being returned.

Upon selection of a create loan button 425, the booking is finalised and the cabinet screen, or a variation thereof, is shown to identify a location of the key 110 being booked. The key cabinet 115 is also updated such that the LED light 140 associated with the key is clearly identified.

Instead of checking out keys directly, keys can instead be reserved ahead of time to ensure they're in the office when they're needed. This is useful if a tradesperson is booked in at the property, or an upcoming inspection, as it will prevent the key from being borrowed out to someone else during that period.

In addition to enabling keys to be checked in and out, the system 100 enables reports to be quickly and easily generated relating to the cabinet 115. Such reports may include checked out keys, or missing and overdue keys, and enable an administrator to get an overview of the system 100, conduct audits and the like.

Figure 5:
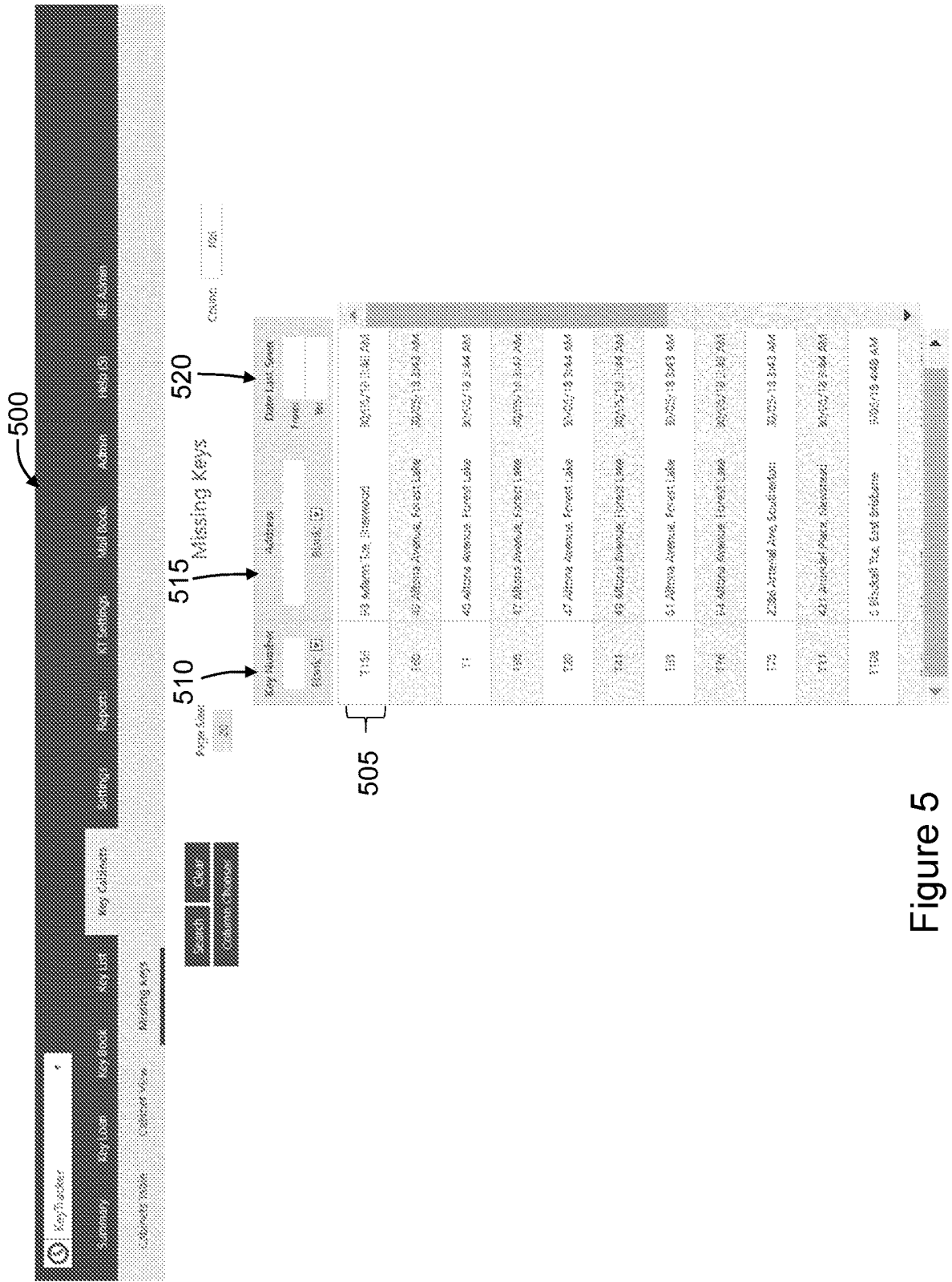
FIG. 5 illustrates a screenshot of a missing keys screen, according to an embodiment of the present invention.

FIG. 5 illustrates a screenshot 500 of a missing keys screen, according to an embodiment of the present invention. The missing keys screen is an example of a report that that been generated in the system The missing keys screen includes a plurality of missing key rows 505, each row 505 corresponding to a missing key 110. In this case, the term "missing key" can refer to a key 110 that has been properly loaned by not been returned before its due date, or a key 110 that is missing for any reason.

Each of the missing key rows 505 includes a key number field 510, an address field 515 and a date of last interaction field 520.

The user, such as the property manager 105, may search the list based upon key number, address and dates, to identify any patterns associated with missing keys.

Each row 505 is selectable, to obtain more details thereon. Such details may include logged data associated with the property (e.g. when the property has been searched for, and by whom), and details of associated bookings and returns. This may be particularly useful if the key has been manually identified as being returned, but never actually returned.

In addition to enabling reports to be generated, the system 100 includes a dashboard, which provides a quick overview of the system 100 and importantly the keys being managed.

Figure 6:
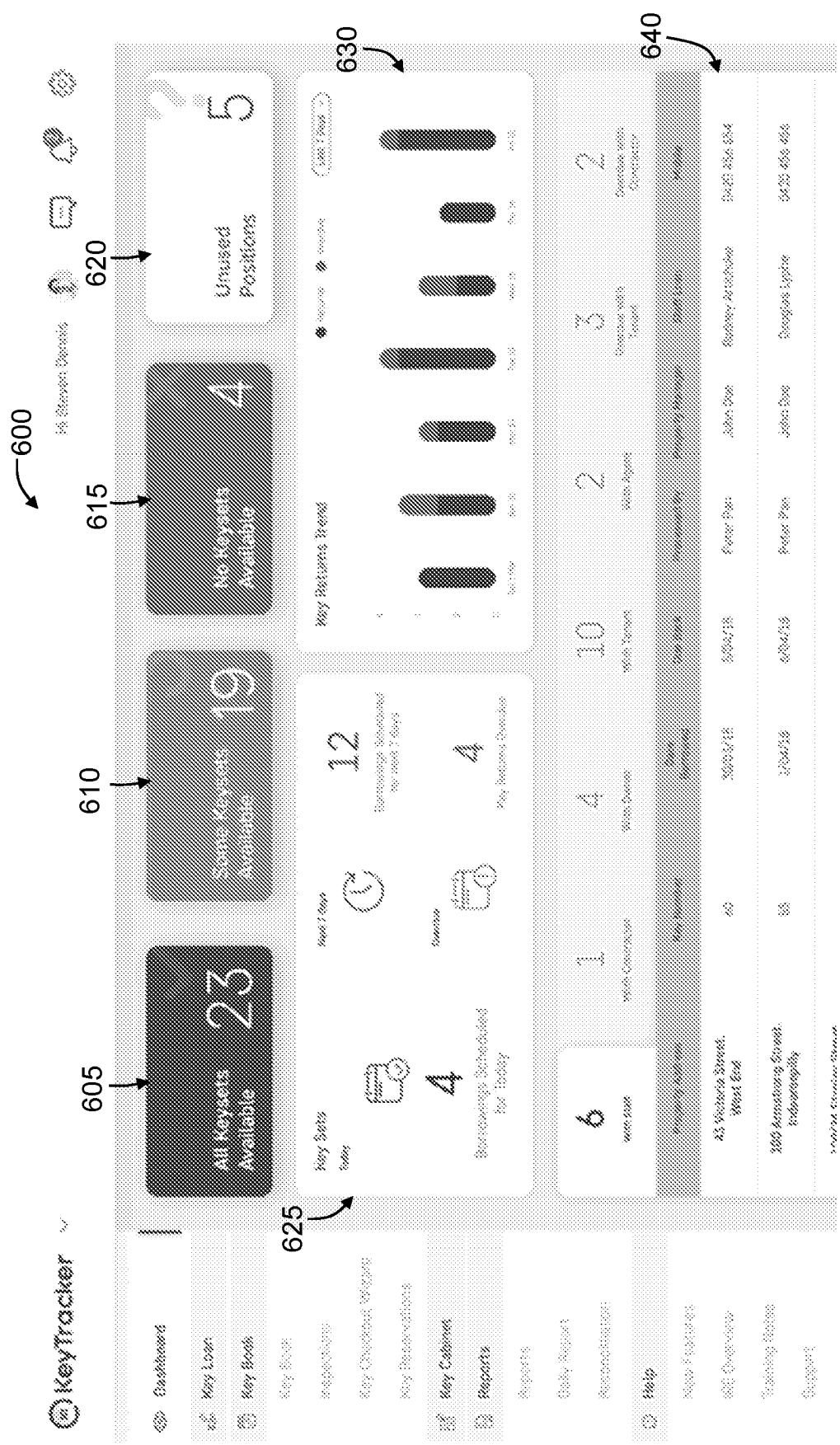
FIG. 6 illustrates a screenshot of a dashboard of the system of FIG. 1, according to an embodiment of the present invention.

FIG. 6 illustrates a screenshot 600 of a dashboard of the system 100, according to an embodiment of the present invention. The dashboard provides an overview of the keys of the system 100, including how many are available, upcoming bookings, trends and the like.

The dashboard includes an "all keysets available" element 605, indicating how many keysets are fully available, a "some keysets available" element 610, indicating how many keysets are partially available, a "no keysets available" element 615, indicating how many keysets are not available, and an "unused position" element 620, indicating how many unused positions are on the board. This enables the property manager 105 to get a quick overview of what is available and missing, as well as how far from filling the cabinet 115 they currently are.

The dashboard further includes a schedule overview element 625, which provides an overview of the scheduled borrowings for that particular day, scheduled borrowings for the week, and overdue key returns. This assists the property manager 105 in planning for the day and week.

The dashboard includes a key trend element 630, which provides a trend of key returns, which may be provided on a daily, weekly, or monthly basis, for example. The trend element shows, as a bar chart, how many keys were returned, and how many became overdue in for each period (e.g. day, week or month).

The key trend element 630 enables the property manager 105 to identify trends in the key returns, such as particular days in which key returns are higher than others, or sudden or gradual increases in overdue keys.

Finally, the dashboard includes a key overview element 640, which provides an overview of each of the keys that is checked out according to whether the keys are with staff, with a contractor, with the owner, with the tenant, or with the agent, as well as whether the keys are overdue with the tenant or overdue with the contractor. This enables the property manager to quickly see where the keys are, and with whom.

According to certain embodiments, the system includes a notification module, which alerts the property manager 105 when keys are checked in and out and by whom. The notification module may include other information in the notification, such as when the keys are due back.

Similarly, the notification module may issue alerts when keys become overdue, with details of the person that has borrowed the keys. This enables the user receiving the alerts to be aware that that haven't been returned on time, and follow up immediately.

The notification module can also alert the borrower when the key is due back, as outlined above. Daily reminders may be automatically sent to the borrower when a key is overdue until it is returned.

Notifications or alarms may issue to the property manager if any problem is identified. For example, if a key is removed without checking it out an alert may immediately issue. The property manager may use the timestamps recorded from interactions with the server to see who was logged in at that time to help identify who may have taken the key. In many cases, the last person to look up a particular key prior to it going missing is the person who has taken it.

Notifications may issue when other agents are borrowing keys. In particular, the system may determine that the person borrowing the key is another agent (or otherwise a competitor), e.g. based upon a predefined list. This in turn enables the property manager to contact clients and remedy any issues, to avoid having management of the property transferred.

Finally, notifications may issue even when expected actions occur, such as confirmation notifications when keys are returned.

Figure 7:
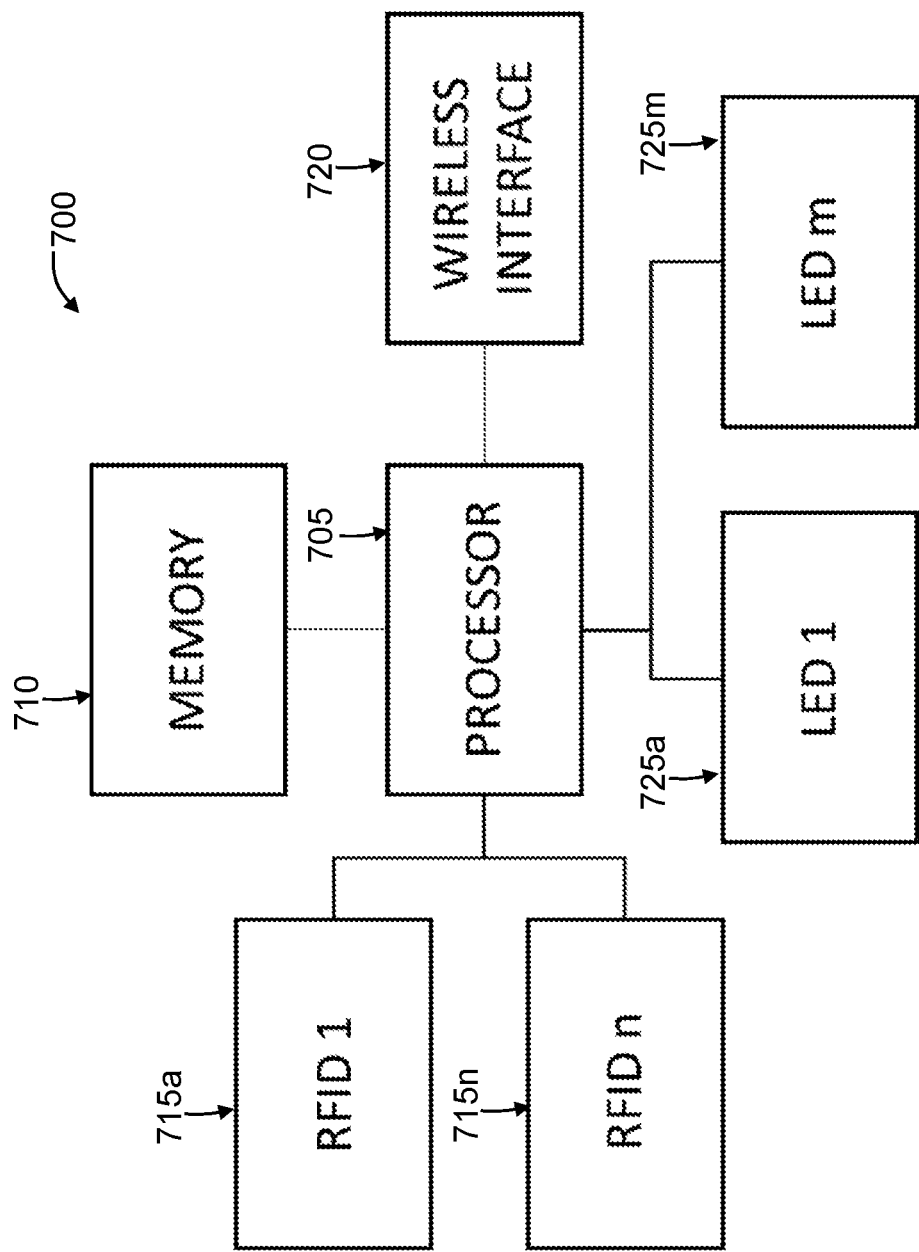
FIG. 7 illustrates a schematic of a controller 700, according to an embodiment of the present invention.

As outlined above, the cabinet 115 includes a controller, which enables communication with the server. FIG. 7 illustrates a schematic of a controller 700, according to an embodiment of the present invention.

The controller includes a processor 705, a memory 710 coupled to the processor, and a plurality of RFID readers 715*a-n* coupled to the processor 705. The memory 710 includes instruction code executable by the processor 705 for reading data from key rings using the RFID readers 715*a-n*. The data may be read periodically or continuously.

The processor 705 is further coupled to a wireless data interface 720, and the memory 710 is further configured to send the data from the key rings (or absence of data to indicate that a key is not present) to a remote server. The wireless data interface 720 is advantageously a WIFI data interface, but could also comprise a cellular data interface (e.g. 4G or LTE data interface).

The processor 705 is further coupled to a plurality of LED lights 725*a-m*, and the memory 710 is configured to receive data on the wireless interface 720 (and from the server) and illuminate the LED lights 725*a-m* based thereon. As outlined above, the lights 725*a-m* may be illuminated to illustrate a status of the associate key position.

According to certain embodiments, the RFID key chain 120 also include remote tracking capabilities. As an illustrative example, the RFID key chain 120 may include a global positioning system (GPS) sensor and a data interface configured to send data from the GPS sensor to the remote server 130. In case a key is missing or overdue, the system 100 may be used to request location data from the RFID key chain 120. The received location data may then be presented to the user making the request, e.g. on a map, enabling the user to further investigate a location of the key.

The data interface may be any suitable interface including a Bluetooth, radio (e.g. UHF) or a cellular data interface. Similarly, Bluetooth or UHF capabilities may not only be used as a data interface, but also for indoor short-range location of keys. This is particularly useful as it enables keys to be searched locally without requiring any long-range communications means (e.g. a cellular interface) to be provided in the key chain 120, and as such, enables key chains 120 to be produced at a low cost.

In addition to enabling a user to check a location of a key on-demand, the system may be configured to automatically request or determine a location of a key when certain conditions are met, such as when the keys become overdue, or when the keys become missing.

According to certain embodiments, the server includes an import tool, to simplify the import of a large number of keys into the system. The import tool may be configured to import key numbers by CSV file, or any other suitable way, to avoid having to enter each key manually. This is particularly useful when transitioning to the system from a manual or spreadsheet-based system.

In order to simplify checking in keys, a barcode may be provided on the key ring. When the key is returned, the barcode may be scanned by the system, and automatically identify a location to which the key is to be returned.

Similarly, keys may be checked out using a barcode, which may be printed on work orders or the like. As such, the user need not enter any data associated with the property to identify the key that is required.

While the above has been described with reference to a single property manager 105, the skilled addressee will readily appreciate that multiple property managers will utilise the system and share key cabinets, as well as associated staff. In such case, different property managers may be issued with notifications depending on whether the property associated with the key is managed by them or not.

Furthermore, while the above has been described with reference to a single key cabinet, the skilled addressee will readily appreciate that multiple key cabinets may be used. In one embodiment, the system may be configured to identify in which cabinet a key is located, in addition to its location within the cabinet.

Furthermore, while the system is described above with reference to cabinets, the skilled addressee will readily appreciate that the system may take any suitable shape or form. As an illustrative example, a wall of keys may be provided, where the key hooks are positioned directly on a wall rather than in a cabinet. In such case, the system may be built of one or more key panels, which may be connected to each other, enabling the system to be expanded, as needed.

The system may be integrated with other systems, including rental management systems. This is particularly useful in that data need not be entered twice, and the system may automatically reserve keys when a work order is generated, or when a viewing or inspection is booked, for example.

The system 100 may also include security functionality, such as user controlled access to the cabinet to enable identification of those who may have taken keys. Furthermore, a scanner may be associated with an exit of a room or building in which the cabinet is located, to issue an alarm if a key is attempted to be removed from the room or building without having been properly checked out.

While the above is described with reference to property management, the skilled addressee will readily appreciate that such key management may be useful in other industries, such as for cleaners, maintenance businesses (e.g. pool maintenance), or any other business that must manage multiple keys.

Similarly, the skilled addressee will readily appreciate that the system may be used to manage other items, associated with a property or otherwise, such as access cards, garage door remotes, and the like. In such case, storage boxes, shelves or the like may be provided in association with cabinets, or instead of cabinets, with associated RFID readers, to enable storage and monitoring of the items.

Advantageously, the systems described above enable more efficient and accurate management of items such as keys, which in turn reduces the number of missing keys. Furthermore, when keys go missing, this may be quickly identified, increasing the likelihood that the key is found, thus reducing costs and issues associated with missing keys.

Furthermore, the system enables keys to be booked in advance, which prevents the situation where keys are double booked, such as when maintenance is booked in advance, but another person happens to check out the required keys shortly beforehand.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A key management system comprising:
   a plurality of keys, each key of the plurality of keys including an RFID tag associated therewith;
   a plurality of key storage positions, each key storage position of the plurality of key storage positions configured to store at least one key of the plurality of keys associated with that key storage position;
   a plurality of visual indicators each associated with one of the plurality of key storage positions, the plurality of visual indicators each comprising a light emitting diode (LED);
   at least one RFID reader configured to read the RFID tags of the plurality of keys; and
   at least one processor, coupled to the at least one RFID reader, the at least one processor configured to determine a presence of the plurality of keys in respective ones of the plurality of key storage positions,
   wherein the at least one processor provides a graphical user interface including a key loan interface that enables the at least one key associated with each of the plurality of key storage positions to be checked out for use by a user for a certain loan period, the loan period being defined in a checkout process, and wherein, for each of the plurality of key storage positions, an associated visual indicator of the plurality of visual indicators is configured to provide a visual indication of a current status of the at least one key associated with that key storage position, the current status including one of:

- a "checked in" status, when the at least one key is in the key storage position and not checked out for use by the user, wherein the LED associated with the key storage position illuminates green to visually indicate the "checked in" status;
- a "missing" status, when the at least one key is not in the key storage position and has not been validly checked out via the key loan interface, wherein the LED associated with the key storage position illuminates red to visually indicate the "missing" status;
- an "overdue" status, when the at least one key is not in the key storage position, having been validly checked out via the key loan interface and removed from the key storage position previously, but the loan period for which the at least one key was checked out has expired, wherein the LED associated with the key storage position flashes purple to visually indicate the "overdue" status; or
- an "error" status, when there is an error reading the RFID tag of the at least one key in the key storage position or when the RFID tag is not recognized or is invalid, wherein the LED associated with the key storage position flashes red to visually indicate the "error" status;

wherein to visually indicate when the at least one key in the key storage position has been validly checked out for use by the user via the key loan interface, and the loan period has commenced, but the at least one key has not yet been removed from the key storage position, the LED associated with the key storage position illuminates blue.

2. The key management system of claim 1, wherein the at least one processor is configured to:

determine that a key of the plurality of keys is booked by the user for a booked period, the booked period being a loan period commencing at a future time, wherein, for each of the plurality of key storage positions, the associated visual indicator of the plurality of visual indicators is configured to provide a visual indication when the booked period has commenced but the associated key has not yet been removed from the key storage position.

3. The key management system of claim 1, wherein the at least one processor is configured to:

receive, via the key loan interface, a user request to search for a key or keys for one or more properties from among the plurality of keys; and determine a location of one of the plurality of key storage positions associated with the key or keys based upon property information.

4. The key management system of claim 1, wherein the key loan interface prevents a key of the plurality of keys from being checked out by the user during a time period when the keys is booked for use by another user.

5. The key management system of claim 1, wherein the at least one processor is further configured to provide a graphical representation of the plurality of key storage positions, the graphical representation illustrating the current status of the at least one key associated with each of the plurality of key storage positions.

6. The key management system of claim 1, wherein the at least one processor is further configured to generate notifications based upon the current status of the plurality of keys.

7. The key management system of claim 6, wherein the notifications include at least one of:

an indication that a key is due or overdue;

an indication that a key is borrowed or returned, wherein the indication that the key is borrowed or returned is transmitted to a property manager.

8. The key management system of claim 1, wherein the at least one processor is further configured to generate a missing key report that identifies one or more of the plurality of keys that are missing or overdue.

9. The key management system of claim 1, wherein the at least one processor is further configured to generate a dashboard interface that includes an overview of the plurality of keys, wherein the dashboard interface indicates a number of the plurality of keys that are available and a number of the plurality of keys that are not available.

10. The key management system of claim 9, wherein the dashboard interface further indicates historical data relating to at least one of key returns or overdue keys.

11. The key management system of claim 1, further including a scanner for scanning image data associated with each of the plurality of keys.

12. The key management system of claim 11, wherein the image data comprises a QR code or a barcode, and wherein a key of the plurality of keys can be borrowed or returned by scanning with the scanner.

* * * * *